US009644708B2

(12) United States Patent
Gwon et al.

(10) Patent No.: US 9,644,708 B2
(45) Date of Patent: May 9, 2017

(54) 10-STAGE DUAL CLUTCH TRANSMISSION FOR VEHICLE

(71) Applicant: Hyundai Motor Company, Seoul (KR)

(72) Inventors: Yeo Hyeon Gwon, Yongin-si (KR); Choung Wan Son, Seoul (KR); Hyun Chul Kim, Suwon-si (KR); Jin Beom Seo, Suwon-si (KR); Ki Jong Park, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/880,937

(22) Filed: Oct. 12, 2015

(65) Prior Publication Data

US 2016/0341284 A1 Nov. 24, 2016

(30) Foreign Application Priority Data

May 21, 2015 (KR) ........................ 10-2015-0071284

(51) Int. Cl.
*F16H 3/085* (2006.01)
*F16H 3/00* (2006.01)
*F16H 3/08* (2006.01)
*F16H 3/093* (2006.01)

(52) U.S. Cl.
CPC ..... *F16H 3/006* (2013.01); *F16H 2003/0807* (2013.01); *F16H 2003/0931* (2013.01); *F16H 2003/0933* (2013.01); *F16H 2200/0069* (2013.01)

(58) Field of Classification Search
CPC . F16H 3/006; F16H 3/08; F16H 3/085; F16H 2003/0826; F16H 2200/0069; F16H 37/0806
See application file for complete search history.

(56) References Cited

U.S. PATENT DOCUMENTS 7,621,195 B2 11/2009 Hattori
2010/0257961 A1* 10/2010 Rieger .................... F16H 3/006 74/331

FOREIGN PATENT DOCUMENTS

| | | | |
|---|---|---|---|
| EP | 2 578 901 | A1 | 4/2013 |
| JP | 2007-331654 | A | 12/2007 |
| JP | 2010-164192 | A | 7/2010 |
| KR | 10-2011-0024793 | A | 3/2011 |
| KR | 10-1470203 | B1 | 12/2014 |
| KR | 10-2015-0012150 | A | 2/2015 |
| KR | 10-1509982 | B1 | 4/2015 |

* cited by examiner

*Primary Examiner* — Huan Le
(74) *Attorney, Agent, or Firm* — Morgan, Lewis & Bockius LLP

(57) ABSTRACT

A 10-stage dual clutch transmission (DCT) for a vehicle includes: a first input shaft receiving power through a first clutch; a second input shaft disposed coaxially with the first input shaft and receiving power through a second clutch; a plurality of odd driving gears disposed on the first input shaft; a plurality of even driving gears disposed on the second input shaft; a first output shaft and a second output shaft disposed in parallel with the first input shaft and the second input shaft; a plurality of odd driven gears each disposed on the first output shaft or the second output shaft; a plurality of even driven gears disposed each on the first output shaft or the second output shaft; and a joint synchro disposed on the first output shaft or the second output shaft.

7 Claims, 2 Drawing Sheets

9P 5P S9 S5 ST 6&8D 8P S8 S4 4P PG 4D&R OG2 OS2 2D C1 C2 7&9D 3&5D 1D IS1 IS2 OS1 OG1 7P S7 S3 3P 1P S1 S6 6P RP IDS RID2 RID1 SR S2 2P DIFF

| | CLUTCH | | SYNCHRO | | | | | | | | | |
|---|---|---|---|---|---|---|---|---|---|---|---|---|
| | C1 | C2 | ST | S2 | S3 | S4 | S5 | S6 | S7 | S8 | S9 | SR |
| R | | ● | | | | | | | | | | ● |
| 1 | ● | | ● | | | | | | | | | |
| 2 | | ● | | ● | | | | | | | | |
| 3 | ● | | | | ● | | | | | | | |
| 4 | | ● | | | | ● | | | | | | |
| 5 | ● | | | | | | ● | | | | | |
| 6 | | ● | | | | | | ● | | | | |
| 7 | ● | | | | | | | | ● | | | |
| 8 | | ● | | | | | | | | ● | | |
| 9 | ● | | | | | | | | | | ● | |
| 10 | | ● | ● | | | | | | ● | | | |

10-STAGE DUAL CLUTCH TRANSMISSION FOR VEHICLE

CROSS-REFERENCE TO RELATED APPLICATION

The present application claims priority of Korean Patent Application Number 10-2015-0071284 filed May 21, 2015, the entire contents of which application are incorporated herein for all purposes by this reference.

BACKGROUND OF THE INVENTION

Field of the Invention

The present invention generally relates to a double clutch transmission for a vehicle. More particularly, the present invention relates to a transmission that has a reduced length and can achieve a plurality of steps of shifting.

Description of the Related Art

A double clutch transmission (DCT) essentially includes two input shafts of synchro-mesh type manual transmissions, receives power from an engine through two clutches, and sequentially engages adjacent shift gears on the input shafts.

Accordingly, in the double clutch transmission, shift gears that are always in mesh with each other are disposed between the input shafts and an output shaft parallel with the input shafts and synchronizers for selectively coupling/decoupling the shift gears to/from the input shafts or the output shaft, such that the entire length and the number of available ranges of the transmission depend on the number of shift gears and synchronizers.

In order to maximize fuel efficiency by maintaining operation efficiency of an engine in an optimal state in a vehicle, it is required to increase the ranges that can be maximally achieved by a transmission. However, increasing the number of ranges increases the entire length of a transmission, so the transmission is difficult to mount on a vehicle and increases the weight of a vehicle, and accordingly, it may have an adverse influence on the fuel efficiency.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Accordingly, the present invention has been made keeping in mind the above problems occurring in the related art, and the present invention provides a 10-stage dual clutch transmission (DCT) for a vehicle that has a reduced weight and reduced length, and can be easily mounted on a vehicle and perform shifting in multiple steps of eight to ten forward steps.

In order to achieve the above object, according to one aspect of the present invention, there is provided a 10-stage dual clutch transmission (DCT) for a vehicle that includes: a first input shaft receiving power through a first clutch; a second input shaft disposed coaxially with the first input shaft and receiving power through a second clutch; a plurality of odd driving gears disposed on the first input shaft to implement odd ranges of a 1-range to a 9-range; a plurality of even driving gears disposed on the second input shaft to implement even ranges of a 2-range to an 8-range; a first output shaft and a second output shaft disposed in parallel with the first input shaft and the second input shaft; a plurality of odd driven gears each disposed on the first output shaft or the second output shaft to implement odd ranges by engaging with the odd driving gears; a plurality of even driven gears each disposed on the first output shaft or the second output shaft to implement even ranges by engaging with the even driving gears; and a joint synchro disposed on the first output shaft or the second output shaft and coupling or decoupling any one of the odd driven gears on the corresponding shaft and any one of the even driven gears with or from each other.

The odd driving gears on the first input shaft may include a first driving gear for implementing the 1-range, a third-fifth driving gear for implementing the 3-range and the 5-range, and a seventh-ninth driving gear for implementing the 7-range and the 9-range, and the even driving gears on the second input shaft may include a second driving gear for implementing the 2-range, a fourth-reverse driving gear for implementing the 4-range and a reverse range, and a sixth-eighth driving gear for implementing the 6-range and the 8-range.

The odd driven gears and even driven gears on the first output shaft may include a first driven gear for implementing the 1-range, a second driven gear for implementing the 2-range, a third driven gear for implementing the 3-range, a sixth driven gear for implementing the 6-range, and a seventh driven gear for implementing the 7-range, and the odd driven gears and even driven gears on the second output shaft may include a fourth driven gear for implementing the 4-range, a fifth driven gear for implementing the 5-range, an eighth driven gear for implementing the 8-range, and a ninth driven gear for implementing the 9-range.

The fifth driven gear and the eighth driven gear may be adjacent to each other on the second output shaft, and the joint synchro may couple or decouple the fifth driven gear and the eighth driven gear to or from each other.

The second driven gear, the sixth driven gear, the first driven gear, the third driven gear, and the seventh driven gear may be sequentially disposed on the first output shaft, and a reverse driven gear for the reverse range may be disposed between the second driven gear and the sixth driven gear on the first output shaft.

The 10-stage DCT may further include: an idler shaft disposed in parallel with the first output shaft; a first idler gear rotatably disposed on the idler shaft and engaged with the fourth driving gear; and a second idler gear integrally connected with the first idler gear and engaged with the reverse driven gear.

A parking gear may be integrally disposed on the second output shaft in parallel with the second driving gear and the second driven gear.

The fourth driven gear, the eighth driven gear, the fifth driven gear, and the ninth driven gear may be sequentially disposed on the second output shaft, a first output gear for receiving power in mesh with a differential may be integrally disposed on the first output shaft, and a second output gear for receiving power in mesh with the differential separately from the first output gear may be integrally disposed on the second output shaft.

According to the present invention, a 10-stage DCT for a vehicle that has a reduced weight and reduced length, and can be easily mounted on a vehicle and perform shifting in multiple steps of eight to ten forward steps. Therefore, it is possible to improve fuel efficiency with efficient driving of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
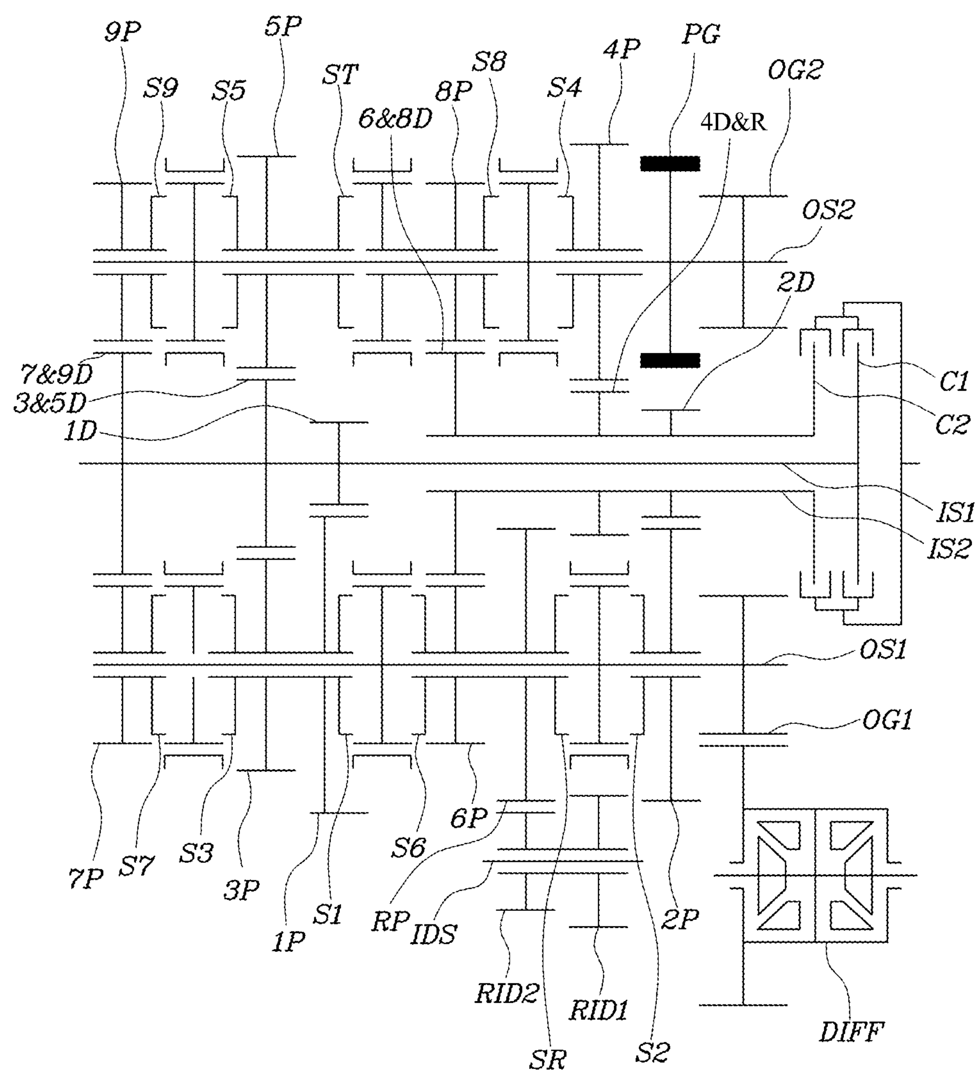
FIG. 1 is a diagram showing the configuration of a 10-stage dual clutch transmission (DCT) for a vehicle according to an embodiment of the present invention.
Figures 2, 3:
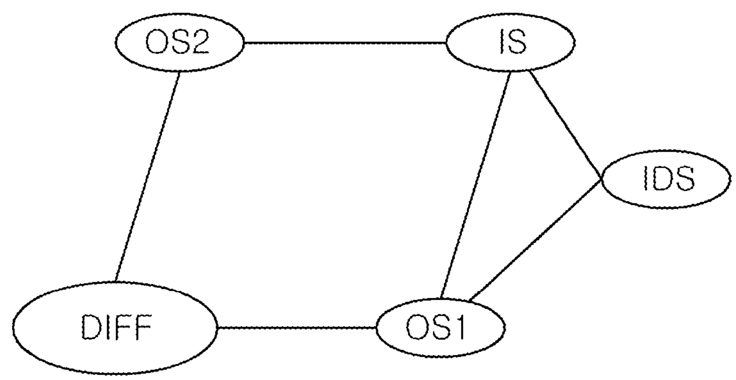
FIG. 2 is a side view showing arrangement of shafts of a 10-stage dual clutch transmission (DCT) illustrated in FIG. 1.
FIG. 3 is a table showing operation modes that include ten steps of forward shifting and one step of reverse shifting with the transmission shown in FIG. 1.

Referring to FIGS. 1 and 2, a 10-stage dual clutch transmission (DCT) for a vehicle according to an embodiment of the present invention includes: a first input shaft IS1 receiving power through a first clutch C1; a second input shaft IS2 disposed coaxially with the first input shaft IS1 and receiving power through a second clutch C2; a plurality of odd driving gears disposed on the first input shaft to implement odd ranges of a 1-range to a 9-range; a plurality of even driving gears disposed on the second input shaft to implement even ranges of a 2-range to an 8-range; a first output shaft OS1 and a second output shaft OS2 disposed in parallel or substantially parallel with the first input shaft and the second input shaft; a plurality of odd driven gears disposed on the first output shaft and the second output shaft to implement odd ranges by engaging with the odd driving gears; a plurality of even driven gears disposed on the first output shaft and the second output shaft to implement even ranges by engaging with the even driving gears; and a joint synchro ST disposed on the first output shaft or the second output shaft and coupling or decoupling any one of the odd driven gears on the corresponding shaft and any one of the even driven gears with or from each other.

The odd driving gears on the first input shaft are composed of a first driving gear 1D for implementing the 1-range, a third-fifth driving gear 3&5D for implementing the 3-range and the 5-range, and a seventh-ninth driving gear 7&9D for implementing the 7-range and the 9-range.

The even driving gears on the second input shaft are composed of a second driving gear 2D for implementing the 2-range, a fourth-reverse driving gear 4D&R for implementing the 4-range and a reverse range, and a sixth-eighth driving gear 6&8D for implementing the 6-range and the 8-range.

The odd driven gears and even driven gears on the first output shaft are composed of a first driven gear 1P for implementing the 1-range, a second driven gear 2P for implementing the 2-range, a third driven gear 3P for implementing the 3-range, a sixth driven gear 6P for implementing the 6-range, and a seventh driven gear 7P for implementing the 7-range.

The odd driven gears and even driven gears on the second output shaft are composed of a fourth driven gear 4P for implementing the 4-range, a fifth driven gear 5P for implementing the 5-range, an eighth driven gear 8P for implementing the 8-range, and a ninth driven gear 9P for implementing the 9-range.

The fifth driven gear 5P and the eighth driven gear 8P are adjacent to each other and the joint synchro ST may couple or decouple the fifth driven gear 5P and the eighth driven gear 8P.

The second driven gear 2P, the sixth driven gear 6P, the first driven gear 1P, the third driven gear 3P, and the seventh driven gear 7P are sequentially disposed on the first output shaft, and a reverse driven gear RP for a reverse range is disposed between the second driven gear 2P and the sixth driven gear 6P on the first output shaft.

In order to implement the reverse range with the reverse driven gear, an idler shaft IDS disposed in parallel or substantially parallel with the first output shaft, a first idler gear RID1 rotatably disposed on the idler shaft and engaged with the fourth driving gear, and a second idler gear RID2 integrally connected with the first idler gear and engaged with the reverse driven gear are provided.

A parking gear PG is integrally disposed on the second output shaft in parallel or substantially parallel with the second driving gear 2D and the second driven gear 2P to reduce the length of the transmission by reducing unnecessary occupation of a space.

The fourth driven gear 4P, the eighth driven gear 8P, the fifth driven gear 5P, and the ninth driven gear 9P are sequentially disposed on the second output shaft, a first output gear OG1 for receiving power in mesh with a differential DIFF is integrally disposed on the first output shaft, and a second output gear OG2 for receiving power in mesh with the differential separately from the first output gear is integrally disposed on the second output shaft.

For reference, the first driven gear 1P to the ninth driven gear 9P are rotatably disposed on the first output shaft or the second output shaft and synchronizers selectively couple/decouple the driven gears for the ranges to/from the first output shaft or the second output shaft, similar to the synchro-mesh shifting mechanism in the related art. Further, a first synchro S1, a second synchro S2, a third synchro S3, a fourth synchro S4, a fifth synchro S5, a sixth synchro S6, a seventh synchro S7, an eighth synchro S8, and a ninth synchro S9 are disposed at sides of the driven gears and a reverse synchro SR is disposed on the first output shaft OS1 at a side of the rear driven gear to selectively couple/decouple the reverse driven gear to/from the first output shaft.

A specific shift gear for the 10-range is not provided in the configuration of an embodiment of the present invention described above, but ten steps of forward shifting and one step of reverse shifting can be achieved, as shown in FIG. 3, so it is possible to achieve a plurality of steps of shifting with fewer shift gears while reducing the weight and entire length of the transmission. Accordingly, it is possible to greatly improve fuel efficiency of a vehicle by improving energy efficiency of the vehicle.

In some embodiments, the 10-stage DCT for a vehicle of the present invention can implement the ranges in accordance with an operation mode table, as in FIG. 3, and the 1-range to the 9-range can be implemented by engaging the corresponding synchros, similar to a common DCT of the related art.

In the DCT of the present invention, the 10-range is implemented by engaging the second clutch and then engaging the seventh synchro with the joint clutch engaged, in which the power from the engine is output to the differential sequentially through the eighth driving gear and the eighth driven gear, the joint clutch, the fifth driven gear and the fifth driving gear, the first input shaft, the seventh driving gear and the seventh driven gear, the seventh synchro, the first output shaft, and the first output gear from the second clutch and the second input shaft.

The transmission gear ratio in the 10-range is obtained from transmission gear ratio in the 8-range/transmission gear ratio in the 5-range×transmission gear ratio in the 7-range.

The reverse range is implemented by engaging the reverse synchro with the second clutch engaged, in which the power from the engine is outputted to the differential through the fourth driven gear, the first idler gear, the second idler gear, the reverse driven gear, the reverse synchro, the first output shaft, and the first output gear from the second input shaft.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A 10-stage dual clutch transmission (DCT) for a vehicle, comprising:

a first input shaft receiving power through a first clutch;

a second input shaft disposed coaxially with the first input shaft and receiving power through a second clutch;

odd driving gears disposed on the first input shaft to implement odd gear shift steps of a 1st gear shift step to a 9th gear shift step;

even driving gears disposed on the second input shaft to implement even gear shift steps of a 2nd gear shift step to a 8th gear shift step;

a first output shaft and a second output shaft each disposed in parallel with the first input shaft and the second input shaft;

odd driven gears each disposed on the first output shaft or the second output shaft to implement the odd gear shift steps by engaging with the odd driving gears;

even driven gears each disposed on the first output shaft or the second output shaft to implement the even gear shift steps by engaging with the even driving gears; and a joint synchro disposed on the first output shaft or the second output shaft and selectively coupling any one of the odd driven gears on the corresponding shaft to any one of the even driven gears, wherein the odd driving gears on the first input shaft comprise a first driving gear for implementing the 1st gear shift step, a third-fifth driving gear for implementing a 3rd gear shift step and a 5th gear shift step, and a seventh-ninth driving gear for implementing a 7th gear shift step and the 9th gear shift step, and wherein the even driving gears on the second input shaft comprise a second driving gear for implementing the 2nd gear shift step, a fourth-reverse driving gear for implementing a 4th gear shift step and a reverse gear shift step, and a sixth-eighth driving gear for implementing a 6th gear shift step and an 8th gear shift step.

2. The 10-stage DCT of claim 1, wherein:

the odd driven gears and the even driven gears on the first output shaft comprise a first driven gear for implementing the 1st gear shift step, a second driven gear for implementing the 2nd gear shift step, a third driven gear for implementing the 3rd gear shift step, a sixth driven gear for implementing the 6th gear shift step, and a seventh driven gear for implementing the 7th gear shift step, and the odd driven gears and the even driven gears on the second output shaft comprise a fourth driven gear for implementing the 4th gear shift step, a fifth driven gear for implementing the 5th gear shift step, an eighth driven gear for implementing the 8th gear shift step, and a ninth driven gear for implementing the 9th gear shift step.

3. The 10-stage DCT of claim 2, wherein, the fifth driven gear and the eighth driven gear are adjacent to each other on the second output shaft, and the joint synchro couples or decouples the fifth driven gear and the eighth driven gear to or from each other.

4. The 10-stage DCT of claim 2, wherein:

the second driven gear, the sixth driven gear, the first driven gear, the third driven gear, and the seventh driven gear are sequentially disposed on the first output shaft, and a reverse driven gear for the reverse gear shift step is disposed between the second driven gear and the sixth driven gear on the first output shaft.

5. The 10-stage DCT of claim 4 further comprising:

an idler shaft disposed in parallel with the first output shaft;

a first idler gear rotatably disposed on the idler shaft and engaged with the fourth driving gear; and a second idler gear integrally connected with the first idler gear and engaged with the reverse driven gear.

6. The 10-stage DCT of claim 2, wherein a parking gear is integrally disposed on the second output shaft in parallel with the second driving gear and the second driven gear.

7. The 10-stage DCT of claim 2, wherein:

the fourth driven gear, the eighth driven gear, the fifth driven gear, and the ninth driven gear are sequentially disposed on the second output shaft, a first output gear for receiving power in mesh with a differential is integrally disposed on the first output shaft, and a second output gear for receiving power in mesh with the differential separately from the first output gear is integrally disposed on the second output shaft.

* * * * *